(12) United States Patent
Yoshino

(10) Patent No.: US 7,885,719 B2
(45) Date of Patent: Feb. 8, 2011

(54) PORTABLE COMMUNICATION TERMINAL, MESSAGE OUTPUT METHOD USED FOR THE PORTABLE COMMUNICATION TERMINAL, AND PROGRAM THEREFOR

(75) Inventor: Yukiko Yoshino, Tokyo (JP)

(73) Assignee: NEC Corporation, Tokyo (JP)

( * ) Notice: Subject to any disclaimer, the term of this patent is extended or adjusted under 35 U.S.C. 154(b) by 1441 days.

(21) Appl. No.: 11/319,103

(22) Filed: Dec. 28, 2005

(65) Prior Publication Data

US 2006/0153393 A1 Jul. 13, 2006

(30) Foreign Application Priority Data

Jan. 12, 2005 (JP) ............... 2005-004630

(51) Int. Cl.
*H04R 29/00* (2006.01)
*G08B 3/00* (2006.01)
*G08B 25/08* (2006.01)
*G08B 3/10* (2006.01)
*G06F 17/00* (2006.01)
*G06F 3/00* (2006.01)
*G06F 3/16* (2006.01)

(52) U.S. Cl. ............... 700/94; 455/550.1; 340/691.1; 340/692; 340/384.1; 340/384.7; 715/700; 715/716; 715/727; 381/56; 381/124

(58) Field of Classification Search ............... 381/56, 381/124, 311; 455/550.1; 700/94; 340/691.1, 340/692, 384.1, 384.7; 715/700, 716, 727, 715/728

See application file for complete search history.

(56) References Cited

U.S. PATENT DOCUMENTS

| 6,342,831 | B1 | 1/2002 | Azima |
| 7,003,123 | B2 * | 2/2006 | Kanevsky et al. ............... 381/72 |
| 2001/0026625 | A1 | 10/2001 | Azima et al. |
| 2002/0065113 | A1 | 5/2002 | Mori |
| 2005/0002537 | A1 | 1/2005 | Azima et al. |
| 2005/0129267 | A1 * | 6/2005 | Azima et al. ............... 381/431 |
| 2006/0068858 | A1 | 3/2006 | Hulskemper |

FOREIGN PATENT DOCUMENTS

| DE | 100 65 562 A1 | 7/2002 |
| DE | 102 30 898 A1 | 1/2004 |
| EP | 1 542 064 A1 | 6/2005 |
| JP | 2002-164977 A | 6/2002 |
| JP | 2002-533957 A | 10/2002 |
| WO | WO 02/49003 A1 | 6/2002 |
| WO | WO 2004/023199 A1 | 3/2004 |
| WO | WO 2004/054317 A1 | 6/2004 |
| WO | WO 2004/107808 A2 | 12/2004 |

* cited by examiner

*Primary Examiner*—Devona E Faulk
(74) *Attorney, Agent, or Firm*—Foley & Lardner LLP

(57) ABSTRACT

A communication terminal using a flat panel speaker outputs a message of warning, in forms of sound or text shown on display, before outputting sound from the flat panel speaker.

14 Claims, 3 Drawing Sheets

PORTABLE COMMUNICATION TERMINAL, MESSAGE OUTPUT METHOD USED FOR THE PORTABLE COMMUNICATION TERMINAL, AND PROGRAM THEREFOR

BACKGROUND OF THE INVENTION

1. Field of the Invention

The present invention relates to a portable communication terminal, a message output method used for the portable communication terminal, and a program therefor, and more particularly to a portable communication terminal having a flat panel speaker.

2. Description of the Related Art

An electronic component called a flat panel speaker has been put to practical use. The flat panel speaker is an electronic component in which a display section and a speaker section are integrated. For this reason, the flat panel speaker is effective in downsizing portable electronic devices.

Here, the flat panel speaker is an electronic component in which sound is generated by vibrating a cover portion disposed in front of, if the display section is a liquid crystal panel, the liquid crystal panel, as disclosed in Japanese Patent Application Laid-Open No. 2002-533957 A. The cover portion is, for example, an acrylic plate or a glass plate. A component called an exciter or an actuator attached to the cover portion vibrates the cover portion. The exciter and the actuator are components corresponding to a voice coil and a magnet in a conventional cone speaker.

Japanese Patent Application Laid-Open No. 2002-164977 A proposes a portable communications terminal such as a cellular phone as an electronic device to be downsized with use of the flat panel speaker.

In a cellular phone, a speaker function of the flat panel speaker is used as a speaker for reproducing a ringing tone or music, an ear receiver, or a speaker for hands free communications in which the ear receiver does not need to be put on the user's ear during conversations.

A sound vibrating area of the flat panel speaker, on which the user puts his/her ear to hear sound is larger as compared with an ear receiver of a usual speaker. Thus, it is possible for users, from children to adults, having various distances between the ear and the mouth to use cellular phones having the same size in a natural holding posture. This characteristic of the flat panel speaker is a further advantage in addition to a contribution to downsizing of cellular phones.

In some cellular phones, a speaker for the ear receiver is provided separately from the flat panel speaker, and thus the flat panel speaker is not used for the ear receiver but used mainly as a speaker for reproducing a ringtone or music. Alternatively, only the flat panel speaker is disposed without providing the speaker for the ear receiver in other cases.

In the latter case, the flat panel speaker serves both as the ear receiver and as the speaker for ringing tone or music. The flat panel speaker outputs sound at low volume level when the flat panel speaker serves as the ear receiver for usual phone call. The flat panel speaker outputs ringing tone or music at higher volume level than that for ear receiver use. Further, when the flat panel speaker serves as a speaker for hands free communication, the flat panel speaker also outputs sound at higher volume level than that for usual ear receiver in a phone call.

When the flat panel speaker is used as the ear receiver, the user of the cellular phone hears sound by putting his/her ear against a display also serving as a speaker section. In a state where the user puts his/her ear against the display, when sound is output from the flat panel speaker at a higher volume level than that obtained in a case where the flat panel speaker is used as the ear receiver, the user may be surprised at the loud sound and the ear of the user may be temporarily disabled to hear sound.

SUMMARY OF THE INVENTION

The present invention has been made to solve the above-mentioned problems inherent in a portable communications terminal using a flat panel speaker as an ear receiver. An object of the present invention is to provide a portable communications terminal capable of outputting to a user a message indicating that sound is output from a flat panel, speaker, a message output method used for the portable communications terminal, and a program therefor.

To aim to above object, control section of communications terminal using a flat panel speaker outputs a message of warning before outputting sound from the flat panel speaker.

BRIEF DESCRIPTION OF THE DRAWINGS

The above and other objects, features and advantages of the present invention will become apparent from the following detailed description when taken in conjunction with the accompanying drawings wherein.

DESCRIPTION OF THE PREFERRED EMBODIMENT

Figure 1:
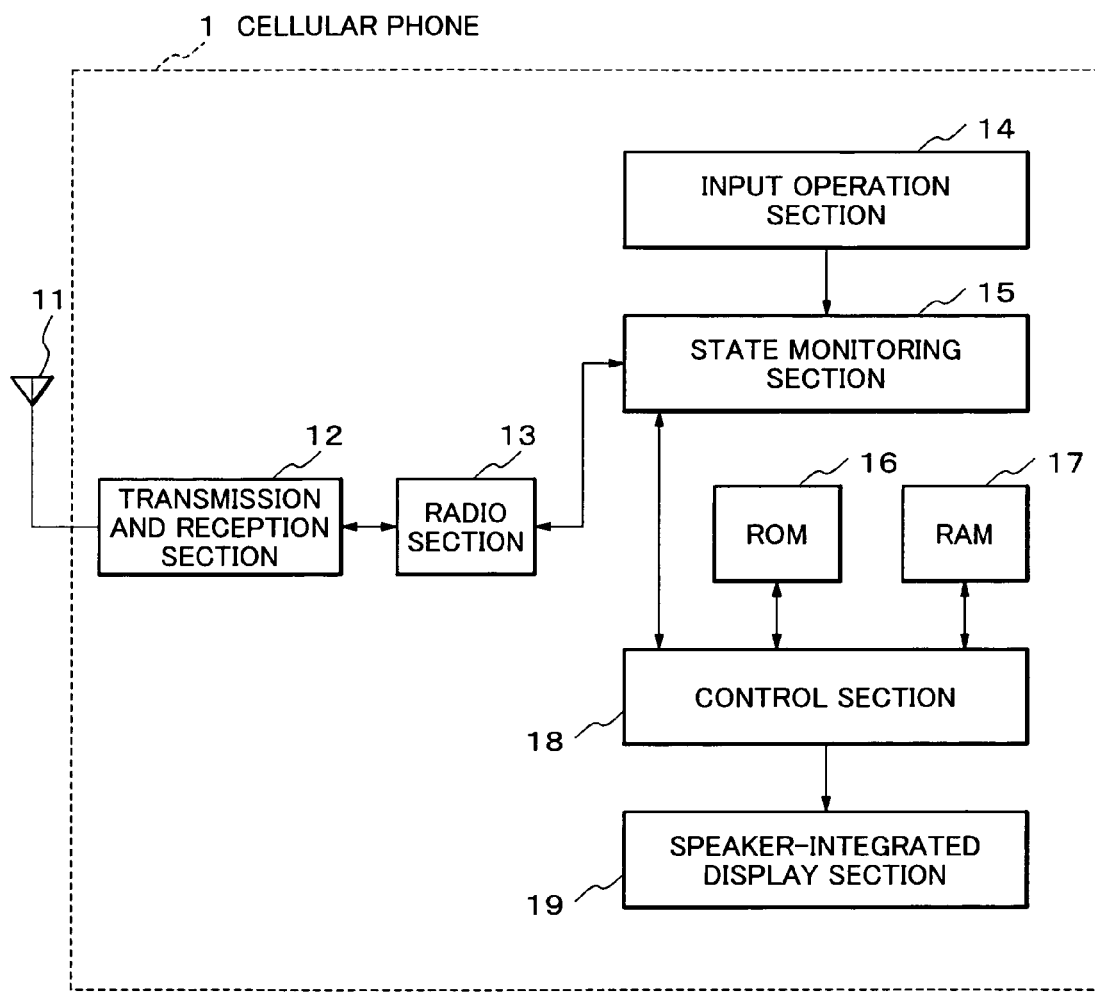
FIG. 1 is a block diagram showing a configuration of a cellular phone according to an embodiment of the present invention.

FIG. 1 is a block diagram showing a configuration of a cellular phone according to an embodiment of the present invention. In FIG. 1, a cellular phone 1 includes an antenna 11, a transmission and reception section 12, a radio section 13, an input operation section 14, a state monitoring section 15, a read only memory (ROM) 16, a random access memory (RAM) 17, a control section 18, and a speaker-integrated display section 19.

An operation example of the cellular phone 1 shown in FIG. 1 will be described. When the cellular phone 1 receives an incoming sound signal from the antenna 11, it transmits the signal to the transmission and reception section 12 and the radio section 13. Then, the cellular phone 1 transmits the signal to the state monitoring section 15 and further to the control section 18, and enters a communications mode of phone call through some steps. When the cellular phone 1 enters a sound communications mode of phone call, the control section 18 transmits the sound signal to the speaker-integrated display section 19. The speaker-integrated display section 19 has both a speaker function and a display function. The speaker-integrated display section 19 outputs the sound signal transmitted from the control section 18 in the form of sound, generating the sound by vibrating a screen portion of the display section. The user of the cellular phone 1 can hear the sound by putting his/her ear against a vibrating area of the screen portion of the speaker-integrated display section 19.

A case of reproducing, for example, a moving image with sound will be described. The control section 18 reads data of a moving image stored in the ROM 16 or the RAM 17. The control section 18 applies reproduction processing to the data read from the ROM 16 or the RAM 17, displays the moving image on the display screen of the speaker-integrated display section 19, and outputs the sound stored with the moving image by using the speaker function of the speaker-integrated display section 19.

At this time, the speaker-integrated display section 19 outputs the sound at such a volume level that the user can sufficiently hear from a position where the user views the moving image reproduced on the display section of the speaker-integrated display section 19. Such a volume level is higher than that of sound the user hears with his/her ear put against an ear receiver section during usual communications.

In the cellular phone 1, an operation for a case of reproducing recorded voice data or using an email message or other text data reading-out function is similar to that for the case of reproducing moving image data stored in the RAM 17 or the ROM 16. The control section 18 displays information about recorded voice data or an email message or other text data to be read out, on the display screen of the speaker-integrated display section 19, and outputs the reproduction sound of the voice data or the email message body reading-out sound, from the speaker section of the speaker-integrated display section 19. The user of the cellular phone 1 hears the sound output from the speaker section of the speaker-integrated display section 19 while viewing the display screen of the speaker-integrated display section 19. Thus, the sound should be output at a reasonable volume level from the speaker section of the speaker-integrated display section 19 for a user who is in some position apart from the cellular phone 1 to view the display screen of the speaker-integrated display section 19.

In this embodiment, when outputting sound from the speaker-integrated display section 19, the cellular phone 1 displays a message on the display section and requests an input operation from the user for confirming the message. In this embodiment, when sound is output from the speaker-integrated display section 19, a message indicating that "keep your ear away from the screen because loud sound is output" is displayed on the display section of the speaker-integrated display section 19.

The user of the cellular phone 1 inputs a response to the displayed message by operating the input operation section 14. Upon reception of the response from the user, the state monitoring section 15 judges the operation and transmits the result of the judgment to the control section 18. The control section 18 switches operations whether or not reproducing data with loud sound from the speaker-integrated display section 19 according to the received judgment result.

Figure 2:
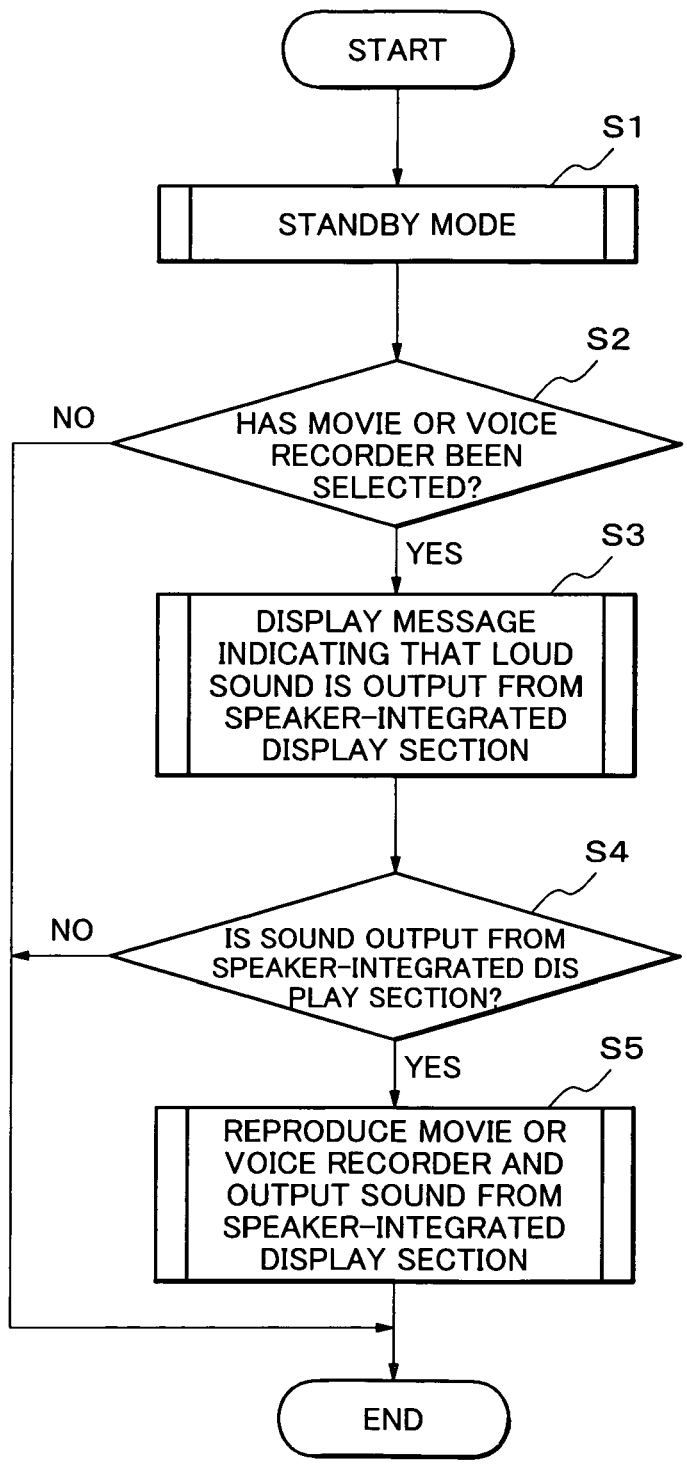
FIG. 2 is a flowchart of an operation of reproducing a moving image or sound in the embodiment of the present invention.

FIG. 2 is a flowchart of an operation of reproducing a moving image or sound in the cellular phone 1 of FIG. 1. Referring to FIGS. 1 and 2, the operation of reproducing a moving image or sound in the cellular phone 1 will be described. The processing shown in FIG. 2 is stored in the ROM 16 as a program and is executed by the control section 18.

FIG. 2 shows a case in which the user performs an operation of reproducing a moving image or sound data with respect to the cellular phone 1 in its standby mode. The user operates the cellular phone 1 to select a moving image or sound data stored in the ROM 16 or the RAM 17 to thereby perform a reproduction operation. Upon reception of the reproduction operation performed by the user (step S2 of FIG. 2), the control section 18 enters a reproduction operation of the selected data. The control section 18 displays, at the time of data reproduction, a message indicating that "is it acceptable to output sound at a high volume level from the speaker-integrated display section?" is displayed on the speaker-integrated display section 19 (step S3 of FIG. 2).

When the user inputs to the cellular phone 1 a response indicating that "output the sound at a high volume level" in response to the message displayed on the speaker-integrated display section 19, the control section 18 starts to reproduce the selected data. When the data is reproduced, sound is output from the speaker-integrated display section 19 (step S5 of FIG. 2). On the other hand, when the user inputs to the cellular phone 1 a response indicating that "do not output the sound at a high volume level", the control section 18 ends the processing without entering a flow of reproducing the selected data.

Figure 3:
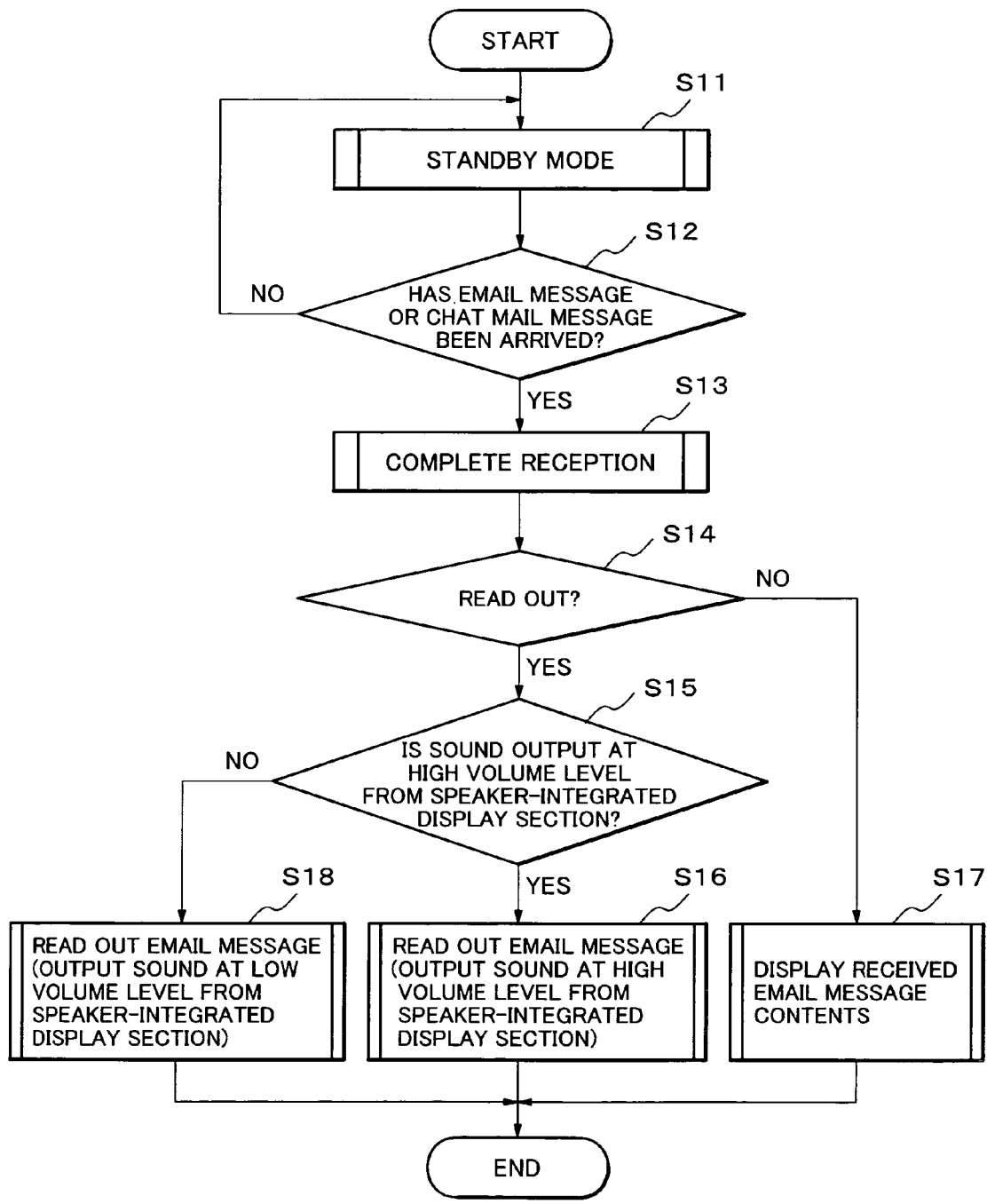
FIG. 3 is a flowchart of an operation of reading out an email message or a chat mail message in the embodiment of the present invention.

FIG. 3 is a flowchart of an operation of reading out an email message or a chat mail message or other text data in the cellular phone 1 of FIG. 1. Referring to FIGS. 1 and 3, the operation of reading out an email message or a chat mail message in the cellular phone 1 will be described. The processing shown in FIG. 3 is stored in the ROM 16 as a program and is executed by the control section 18.

FIG. 3 shows a case in which an email message or a chat mail message arrives at the cellular phone 1 in its standby mode.

When an email message or a chat mail message arrives at the cellular phone 1 (step S12 of FIG. 3), the control section 18 receives it. When the reception is completed (step S13 of FIG. 3), the control section 18 may display "message(s) arrived" on the speaker-integrated display section 19. The control section 18 may also display a message on the screen which indicates that the user can open messages arrived. If the user requests to open messages, the state monitoring section 15 switches the operation mode not for phone call, but for data stored in the ROM 16 or RAM 17. Changing the operation mode for monitoring, the state monitoring section 15 judges a response from the user based on corresponding operation mode. The state monitoring section 15 sends the control section a signal of starting a notifying sequence for the operation mode of data stored in ROM 16 or RAM 17. Receiving the signal, the control section 18 inquires to the user as to whether or not the received message is read out (step S14 of FIG. 3). The state monitoring section 15 judges a response from the user. When the user inputs a response indicating that "do not read out the received message(s)", the control section 18 displays the contents of the received email message without reading out the email message (step S17 of FIG. 3).

On the other hand, when the user inputs a response indicating that "read out the received message(s)", the control section 18 proceeds to processing of reading out the received email message. The control section 18 further displays an inquiry to the user as to whether it is acceptable to output sound of reading out the message body at a high volume level from the speaker-integrated display section 19 (step S15 of FIG. 3). The state monitoring section 15 judges the user's input to the inquiry based on the corresponding operation mode. If the response from the user indicates that "do not read out message(s) at a high volume level", the control section 18 outputs the sound of reading out the message at such a low volume level that the user can hear by putting his/her ear against the ear receiver (step S18 of FIG. 3).

On the other hand, if the response from the user indicates that "read out at a high volume level", the control section 18 displays the email message on the screen and outputs the reading-out sound. At this time, the control section 18 outputs the sound at such a reasonable volume level that the user can hear the reading-out sound without putting his/her ear against the speaker-integrated display section 19 of the cellular phone 1 while viewing the email message displayed on the screen (step S16 of FIG. 3).

As described above, in this embodiment, when sound is output from the speaker-integrated display section 19, a message regarding a terminal operation is displayed on the speaker-integrated display section 19. This message serves as a warning to call the user's attention. In this way, it is possible to avoid such a situation that sound is suddenly output from the speaker-integrated display section 19 and the ear of the user is disabled to hear for a while because of its volume level, or the user is surprised at the volume level of the sound.

In this embodiment, it is also possible to just display a message on the screen without requesting the user to operate the terminal for confirmation. In this case, a message indicating that "keep your ear away from the screen because loud sound is output from the speaker-integrated display section" is displayed for a period of time (2 to 3 seconds) during which the user can read the message, and then deleted. After the message is displayed, sound is output from the speaker-integrated display section 19. In this case, it is possible to display the message on the screen of the speaker-integrated display section 19 without a user's input operation for confirmation, to call the user's attention.

Further, a message is displayed on the screen in this embodiment, but a massage may be output in the form of sound. The sound message is output at a low volume level. This makes it possible to deal with a case in which at a time of message output, the user has already put his/her ear against the speaker-integrated display section 19 so as to use the ear receiver. In this case, the user, who has already put his/her ear against the speaker-integrated display section 19, cannot view the display section of the speaker-integrated display section 19. However, it is possible to safely call attention to the user under such a circumstance by using the sound output at a low volume level. The sound message may be combined with the message displayed on the screen.

The present invention can be applied to the above-described cellular phone irrespective of its shape such as a straight type, a folding type, or a slide type. Further, the present invention can also be applied to, in addition to cellular phones, portable communications terminals, such as personal digital assistants (PDAs), when they have a function to allow the user to hear a voice or sound by putting the user's ear against a vicinity of the screen.

While this invention has been described in connection with a certain exemplary embodiment, it is to be understood that the subject matter encompassed by way of this invention is not to be limited to the specific embodiment. On the contrary, it is intended for the subject matter of the invention to include all alternatives, modifications, and equivalents as can be included within the spirit and scope of the following claims.

Further, it is the inventor's intent to retain all equivalents of the claimed invention even if the claims are amended during prosecution.

What is claimed is:

1. A portable communications terminal comprising:
a speaker-integrated display in which a display screen for displaying an image and character information and a speaker for outputting sound are integrated;
a control section which outputs a warning message for notifying a user of loud sound outputted from the speaker-integrated display; and
an input operation section for the user to recognize the warning message,
wherein the control section outputs a sound from the speaker-integrated display after confirming that the user has recognized the warning message.

2. A portable communications terminal according to claim 1, wherein the control section displays the warning message on the speaker-integrated display.

3. A portable communications terminal according to claim 1, wherein the control section outputs the warning message from the speaker-integrated display in the form of sound.

4. A portable communications terminal comprising:
a speaker-integrated display in which a display screen for displaying an image and character information and a speaker for outputting sound are integrated;
a control section which outputs a warning message for notifying a user of loud sound outputted from the speaker-integrated display; and
a state monitoring section which determines an operation mode of the portable communications terminal,
wherein the control section outputs the warning message for the operation mode determined by the state monitoring section which is at least one of operation modes of reproducing a moving image or a recorded sound message and of reading out text data including a received email message.

5. A portable communications terminal according to claim 1, further comprising a state monitoring section which determines an operation mode of the portable communications terminal as well as judges an input operation by a user, wherein the control section outputs the warning message for the operation mode determined by the state monitoring section which is at least one of operation modes of reproducing a moving image or a recorded sound message and of reading out text data including a received email message.

6. A portable communications terminal according to claim 2, further comprising a state monitoring section which determines an operation mode of the portable communications terminal as well as judges an input operation by a user, wherein the control section outputs the warning message for the operation mode determined by the state monitoring section which is at least one of operation modes of reproducing a moving image or a recorded sound message and of reading out text data including a received email message.

7. A portable communications terminal according to claim 3, further comprising a state monitoring section which determines an operation mode of the portable communications terminal as well as judges an input operation by a user, wherein the control section outputs the warning message for the operation mode determined by the state monitoring section which is at least one of operation modes of reproducing a moving image or a recorded sound message and of reading out text data including a received email message.

8. A warning method for a portable communications terminal having a speaker-integrated display in which a display screen for displaying an image and character information and a speaker for outputting sound are integrated, the warning method comprising the steps of:
confirming an operation mode of the portable communications terminal is to use loud sound;
outputting a warning message notifying that loud sound outputted from the speaker-integrated display; and
sounding from the speaker-integrated display,
wherein the sounding from the speaker-integrated display starts after confirming that a user has recognized the warning message.

9. A warning method according to claim 8, wherein the outputting includes displaying the warning message on the speaker-integrated display.

10. A warning method according to claim 8, wherein the outputting includes outputting the warning message from the speaker-integrated display in the form of sound.

11. A warning method for a portable communications terminal having a speaker-integrated display in which a display screen for displaying an image and character information and a speaker for outputting sound are integrated, the warning method comprising the steps of:

confirming an operation mode of the portable communications terminal is to use loud sound;

outputting a warning message notifying that loud sound outputted from the speaker-integrated display; and sounding from the speaker-integrated display, wherein the outputting the warning message when the confirmed operation mode is at least one of the operation modes of reproducing a moving image or a recorded sound message and of reading out text data including a received email message.

12. A warning method according to claim 8, wherein the outputting the warning message when the confirmed operation mode is at least one of the operation modes of reproducing a moving image or a recorded sound message and of reading out text data including a received email message.

13. A warning method according to claim 9, wherein the outputting the warning message when the confirmed operation mode is at least one of the operation modes of reproducing a moving image or a recorded sound message and of reading out text data including a received email message.

14. A warning method according to claim 10, wherein the outputting the warning message when the confirmed operation mode is at least one of the operation modes of reproducing a moving image or a recorded sound message and of reading out text data including a received email message.

* * * * *